(12) United States Patent
Blachman et al.

(10) Patent No.: US 12,395,510 B2
(45) Date of Patent: Aug. 19, 2025

(54) SYSTEM AND METHOD FOR MONITORING USER ACTIONS WITH RESPECT TO A RESOURCE PRESENTED BY A WEB BROWSER

(71) Applicant: Microsoft Technology Licensing, LLC, Redmond, WA (US)

(72) Inventors: Meir Baruch Blachman, Beer-Sheva (IL); Nitzan Frogel, Tel Aviv (IL); Nir Mardiks Rappaport, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 148 days.

(21) Appl. No.: 18/062,126

(22) Filed: Dec. 6, 2022

(65) Prior Publication Data

US 2024/0187431 A1    Jun. 6, 2024

(51) Int. Cl.
*H04L 29/06* (2006.01)
*H04L 9/40* (2022.01)

(52) U.S. Cl.
CPC ...... *H04L 63/1425* (2013.01); *H04L 63/0884* (2013.01)

(58) Field of Classification Search
None
See application file for complete search history.

(56) References Cited

U.S. PATENT DOCUMENTS

| | | | | |
|---|---|---|---|---|
| 6,052,730 | A  * | 4/2000 | Felciano | G06F 11/3495 |
| | | | | 709/224 |
| 2020/0145385 | A1 | 5/2020 | Chauhan | |
| 2024/0095445 | A1* | 3/2024 | Sharma | G06F 40/166 |

FOREIGN PATENT DOCUMENTS

| | | | | |
|---|---|---|---|---|
| CN | 101023419 B | * | 6/2010 | G06F 16/972 |
| CN | 113553554 A | * | 10/2021 | |

OTHER PUBLICATIONS

"HP Sure Click Secure Browser instead of default PDF handle opening PDF attachments from Outlook", Retrieved From: https://h30434.www3.hp.com/t5/Notebook-Operating-System-and-Recovery/HP-Sure-Click-Secure-Browser-instead-of-default-PDF-handle/td-p/8121782, Retrieved Date: Aug. 22, 2022, 6 Pages.

(Continued)

*Primary Examiner* — Andrew J Steinle
(74) *Attorney, Agent, or Firm* — Weaver IP L.L.C.

(57) ABSTRACT

Systems and methods are described for converting a resource from a first format that is normally rendered by a web browser using a file viewer that prevents monitoring user actions with respect to the resource on behalf of a proxy server into a second format that enables such monitoring. The proxy server injects code into a web page requested by the web browser to cause the web browser to mark a uniform resource locator (URL) of an element that is created by the web page. Upon detecting a request containing the marked URL, the proxy server examines the response corresponding to the request to determine if the response includes a resource in the first format. If the response includes a resource in the first format, the proxy server converts the resource into the second format and transmits the resource to the web browser in the second format.

20 Claims, 8 Drawing Sheets

(56) References Cited

OTHER PUBLICATIONS

"Protected View feature for PDFs (Windows only)", Retrieved From: https://helpx.adobe.com/lu_en/acrobat/using/protected-view-feature-pdfs-windows.html#:~:text=Right-click%20the%20document%20in%20the%20browser%20and%20choose,is%20enabled%2C%20the%20status%20says%20Protected%20Mode%3A%20On, Sep. 30, 2022, 5 Pages.

"Safeguard Secure PDF Viewers", Retrieved From: https://www.locklizard.com/pdf_security_viewer/, Retrieved Date: Aug. 22, 2022, 20 Pages.

"Security warnings when a PDF opens", Retrieved From: https://helpx.adobe.com/acrobat/using/security-warnings-pdf-opens.html, Jan. 11, 2022, 6 Pages.

Goodwin, Audrey, "How to View PDF in Web Browser", Retrieved From: https://pdf.wondershare.com/pdf-knowledge/view-pdf-in-browser.html, Sep. 6, 2022, 9 Pages.

Lknudson, "Open PDF in Browser from pdfViewer control", Retrieved From: https://powerusers.microsoft.com/t5/Building-Power-Apps/Open-PDF-in-Browser-from-pdfViewer-control/td-p/142186, Aug. 1, 2018, 9 Pages.

Moncayo, et al., "PDF viewer control (experimental) in Power Apps", Retrieved From: https://learn.microsoft.com/en-us/power-apps/maker/canvas-apps/controls/control-pdf-viewer, Mar. 18, 2022, 4 Pages.

Smaliarou, Aliaksandr, "AVG Secure Browser as PDF viewer", Retrieved From: https://support.avg.com/answers?id=9060N000000gDVHQA2, Oct. 31, 2018, 2 Pages.

Twohig, et al., "Open pdf in Browser not SharePoint pdf Viewer", Retrieved From: https://techcommunity.microsoft.com/t5/sharepoint/open-pdf-in-browser-not-sharepoint-pdf-viewer/m-p/1345135, Apr. 28, 2020, 8 Pages.

International Search Report and Written Opinion received for PCT Application No. PCT/US23/036969, Feb. 27, 2024, 13 pages.

International Preliminary Report on Patentability received for PCT Application No. PCT/US23/036969, mailed on Jun. 19, 2025, 08 pages.

* cited by examiner

SYSTEM AND METHOD FOR MONITORING USER ACTIONS WITH RESPECT TO A RESOURCE PRESENTED BY A WEB BROWSER

BACKGROUND

A cloud access security broker (CASB) is a web proxy that sits between a web server executing on a server computing device and a web browser executing on a client computing device to monitor interactions between the two sides and enforce security policies during these interactions. For example, the web proxy may be able to intercept resource requests emanating from a web browser and, based on a series of access control protocols, manage what a user of the web browser can access and interact with in regard to a particular set of resources. Furthermore, the web proxy can collect important information about user traffic within a computing ecosystem, which can provide valuable insights for detecting, diagnosing, and remedying possible security breaches.

A conventional CASB web proxy may be configured to modify code (e.g., JavaScript code) included in a web page that it receives from a web server before it passes the web page to a web browser executing on a client computing device. For example, a web proxy may be configured to inject into a web page code that detects actions happening on the client side that should be subject to policy evaluation (e.g., a file upload or download that transpires entirely in the web browser without involvement by the web server). However, the injected code may not be able to detect client-side actions when the content is rendered by the web browser using a file viewer. For example, Chromium-based web browsers render Portable Document Format (PDF) files using a built-in PDF file viewer that limits the visibility of actions by the injected code executing on the web browser.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods described herein enable proxy server monitoring of client-side actions with respect to resources presented by a browser using a file viewer (e.g., PDF files). The proxy server injects code into a web page requested by the web browser to monitor client-side actions with respect to the web page. The web browser, by executing the injected code, can detect the creation of a web page element having a remote source Uniform Resource Locator (URL) and mark the source URL prior to sending a request including the source URL to the proxy server. If the resource referenced by the source URL is in a first format that is normally rendered by the web browser using a file viewer that limits the monitoring of actions with respect to the resource, the proxy server converts the resource into a second format that is rendered by the client browser in a manner that permits the client browser to monitor user actions with respect to the resource on behalf of the proxy server. The proxy server then transmits to the client browser the resource in the second format for rendering thereby in lieu of the resource in the first format.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
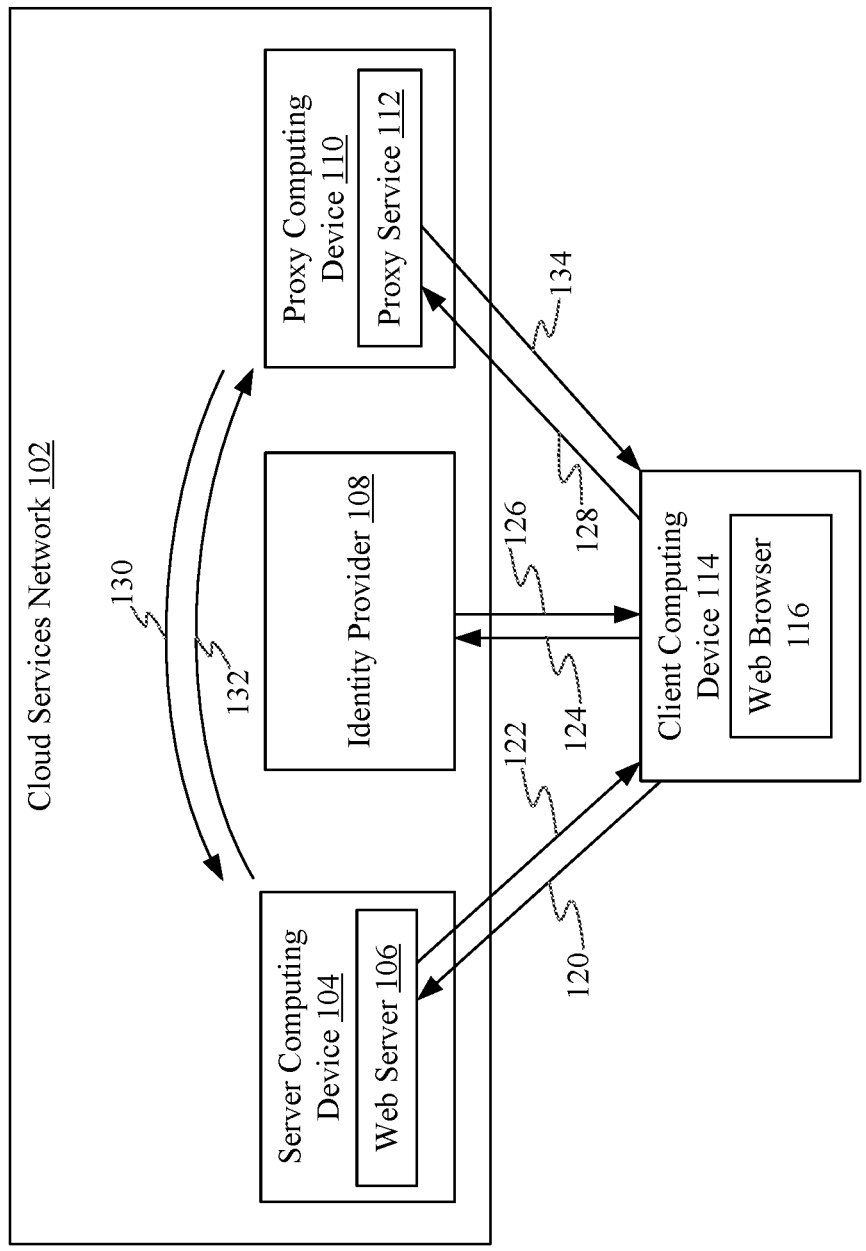
FIG. 1 shows a block diagram of an example system that enables redirection of requests directed to a web server to a proxy service, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As discussed in the Background Section above, a CASB web proxy may be configured to inject code (e.g., JavaScript code) into a web page that it receives from a web server before it passes the web page to a web browser executing on a client computing device. When executed by the web browser, the injected code causes the web browser to monitor and detect client-side actions and to transmit information about the detected actions to a proxy service. For example, actions of interest to the proxy service may include navigation actions, file download actions, file upload actions, asynchronous JavaScript, and XML (AJAX) actions, and/or any other actions that may be executed by web browser responsive to displaying a web page and/or responsive to a user's interactions therewith. The detected actions may be used by the proxy service to carry out enforcement of user, device, network and/or content related policies.

In some cases, monitoring is hindered by the web browser's use of a file viewer. For example, Chromium-based browsers employ a built-in PDF viewer to render PDF files. Actions occurring with respect to PDF files rendered inside the built-in PDF viewer are not visible to the injected code executing on the web browser. The unavailability of monitoring information with respect to PDF files rendered by the web browser using the built-in PDF viewer limits the proxy service's ability to enforce policies on a granular level. As such, enforcement of a policy regarding PDF files would require the proxy service to completely block all PDF files. For example, a policy may allow the viewing of PDF files, but not the printing of PDF files. However, the web browser's built-in PDF viewer limits the proxy service's ability detect when a user is attempting to print a PDF file. As such, to enforce the policy, the proxy service must simply prevent all access to PDF files.

II. System Overview

Systems and methods described herein enable proxy server monitoring of client-side actions with respect to resources presented by a browser using a file viewer (e.g., PDF files). The proxy server injects code into a web page requested by the web browser to monitor client-side actions with respect to the web page. The web browser, by executing the injected code, can detect the creation of a web page element having a remote source URL and mark the source URL prior to sending a request including the source URL to the proxy server. If the resource referenced by the source URL is in a first format that is normally rendered by the web browser using a file viewer that limits the monitoring of actions with respect to the resource, the proxy server converts the resource into a second format that is rendered by the client browser in a manner that permits the client browser to monitor user actions with respect to the resource on behalf of the proxy server. The proxy server then transmits to the client browser the resource in the second format for rendering thereby in lieu of the resource in the first format. For example, the proxy server may convert the resource into a byte array, generate a new web page that that includes the byte array and additional code to cause the web browser to render the resource using the byte array, and then transmit the new web page to the web browser for rendering thereby.

To help illustrate the aforementioned systems and methods, FIG. 1 will now be described. In particular, FIG. 1 is a block diagram of an example system 100 that enables redirection of requests directed to a web server to a proxy service, in accordance with an embodiment. As shown in FIG. 1, system 100 includes a cloud services network 102 and a client computing device 114. As further shown in FIG. 1, cloud services network 102 includes a server computing device 104, an identity provider 108, and a proxy computing device 110. Server computing device 104 is configured to execute a web server 106, proxy computing device 110 is configured to execute a proxy service 112, and client computing device 114 is configured to execute a web browser 116.

In FIG. 1, web server 106 implements an application or service that is capable of serving resources to clients such as client computing device 114, wherein such resources include web pages. Although web server 106 is shown as being implemented on a single server computing device 104, in alternate embodiments web server 106 may be implemented on multiple server computing devices and/or one or more other computing devices.

Identity provider 108 is a computer-implemented system that is configured to create, maintain, and manage identity information associated with users while providing authentication services to relying web services. Identity provider 108 may be implemented, for example, on one or more server computing devices.

Proxy service 112 is a computer-implemented system that is configured to monitor and manage interactions between the application or service implemented by web server 106 and users thereof. Although proxy service 112 is shown as being implemented on a single proxy computing device 110, in alternate embodiments proxy service 112 may be implemented on multiple proxy computing devices and/or one or more other computing devices.

Each component of cloud services network 102 and client computing device 114 may be communicatively connected via one or more networks (not pictured in FIG. 1). These one or more networks may include, for example and without limitation, one or more of a local area network (LAN), a wide area network (WAN), a personal area network (PAN), a private network, a public network, a packet network, a circuit-switched network, a wired network and/or a wireless network.

Client computing device 114 may be any type of computing device, including a stationary or mobile computing device. Examples of a stationary computing device include but are not limited to a desktop computer, a personal computer (PC), a video game console, or a smart appliance (e.g., a smart television). Examples of a mobile computing device include but are not limited to a smart phone, a laptop computer, a notebook computer, a tablet computer, a netbook, or a wearable computing device (e.g., a smart watch, a head-mounted device including smart glasses such as Google® Glass™, etc.)

As depicted in FIG. 1, web browser 116 of client computing device 114 may submit a request to web server 106 of server computing device 104 that requests a resource thereof. The request may be submitted, for example, on behalf of a user of client computing device 114.

In response to receiving request 120, web server 106 may determine that the user has not yet been authenticated and may therefore provide a response 122 to web browser 116 that causes web browser 116 to send a request 124 to identity provider 108 for user authentication. For instance, web server 106 may redirect web browser 116 to identity provider 108 in response to determining that a required authentication artifact (e.g., a token) was not provided with request 120.

After receiving request 124, identity provider 108 may determine based on an access policy whether web browser 116 should access the resource via proxy service 112. An access policy may specify that network cloud traffic associated with certain users, certain groups of users, and/or certain web services should be routed to proxy service 112 for monitoring and/or management. In embodiments, an information technology (IT) administrator for an organization may set access policies for applications and users of client computing devices that access a computer network of the organization. For example, identity provider 108 may evaluate a user's login (e.g., username and password) and determine that there is a policy associated with that user that indicates that the user should access the resource via proxy service 112.

Identity provider 108 may further authenticate the user associated with request 124 and create an authentication artifact (e.g., a token) that can be used by web server 106 to determine whether the user should be granted access to the resource. In some embodiments, during authentication, a user may be prompted by identity provider 108 to provide his or her user login credentials. After determining that web browser 116 should access the resource via proxy service 112, identity provider 108 may send a response 126 to web browser 116 that includes an encrypted version of the authentication artifact and that redirects web browser 116 to send a request 128 to proxy service 112 that includes such encrypted authentication artifact.

After receiving redirected request 128, proxy service 112 may decrypt the authentication artifact and then generate a corresponding request 130 that includes the decrypted authentication artifact and provide it to web server 106. Web server 106 may grant or deny access to the resource based on the authentication artifact. If access is granted, web server 106 may interpret request 130, generate a response 132 to request 130, and issue response 132 to proxy service 112. In some embodiments, response 132 may include a file stored on web server 106 or an output from a program executing on web server 106. In other embodiments, response 132 may include an error message if the request could not be fulfilled.

After receiving response 132, proxy service 112 may generate a response 134 (e.g., a response that includes a web page) and send it to web browser 116. In response to receiving response 134, web browser 116 may interpret response 134 and display contents of response 134 (e.g., when response 134 includes a web page) within a window of web browser 116 for the user of client computing device 114. Response 134 may be the same as response 132 or a response modified by proxy service 112 (as discussed in greater detail herein). Any further requests related to accessing a resource of web server 106 and originating in web browser 116 during the user's proxy session may be directed to proxy service 112, and any responses generated by proxy service 112 to the further requests may be issued to web browser 116 by proxy service 112 on behalf of web server 106.

In some embodiments, proxy service 112 may be configured to act as a suffix proxy. Suffix proxies enable a user to access content via a proxy server by appending the name of the proxy server to a domain URL of the requested content. For example, if a web page identifies a content source using the domain URL "targetapplication.com", proxy service 112 may rename the domain URL such that it instead appears as domain URL "targetapplication.com.proxyserver".

Figure 2:
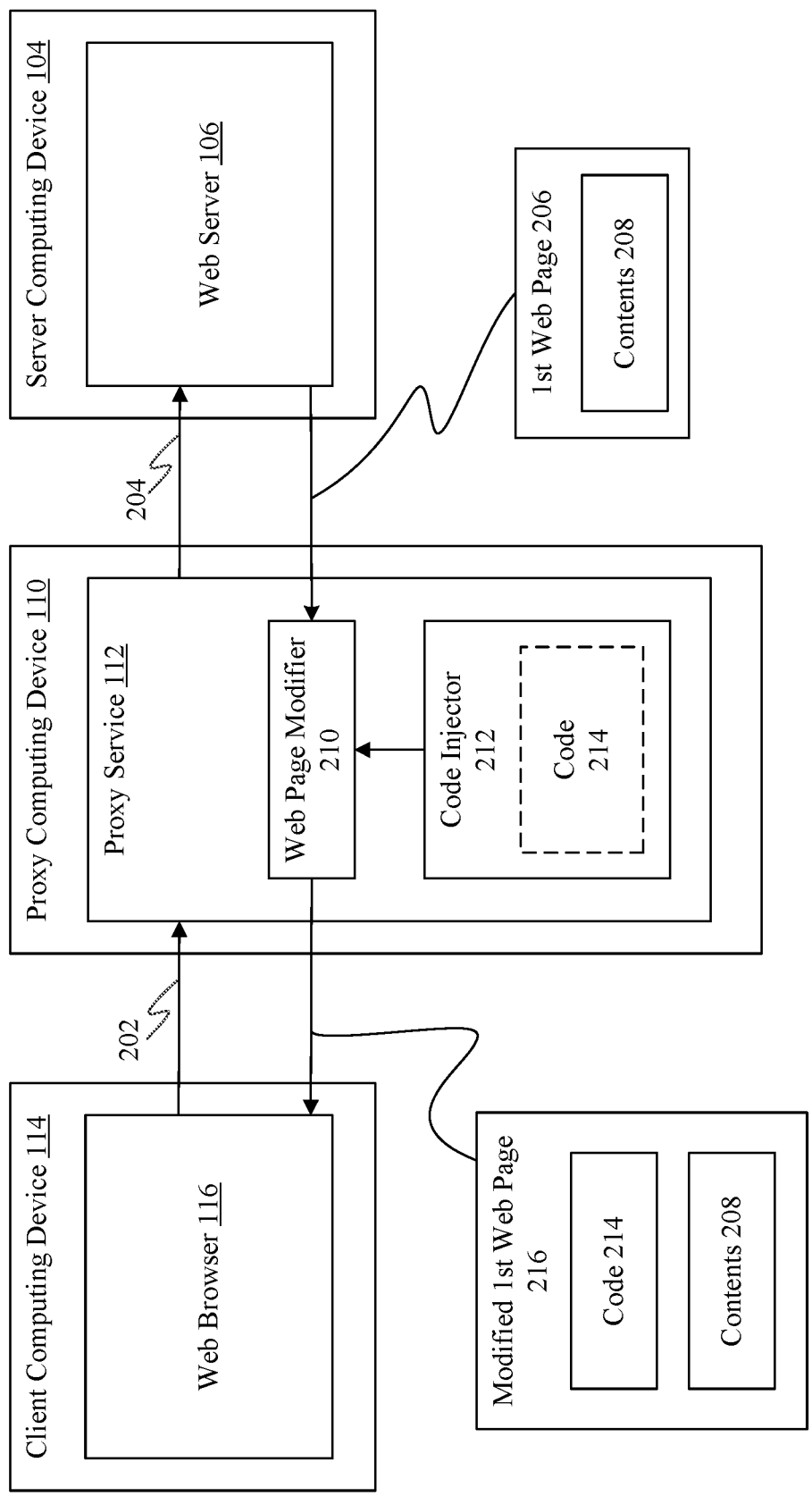
FIG. 2 depicts a block diagram of an example system in which a proxy computing device is interconnected between a client computing device and a server computing device, where the proxy computing device executes a proxy service, the client computing device executes a web browser, and the server computing device executes a web server, in accordance with an embodiment.

To help further illustrate the features of proxy service 112 in accordance with embodiments, FIG. 2 will now be described. In particular, FIG. 2 is a block diagram of an example system 200 in which a proxy computing device is interconnected between a client computing device and a server computing device, where the proxy computing device executes a proxy service, the client computing device executes a web browser, and the server computing device executes a web server, in accordance with an embodiment. As shown in FIG. 2, system 200 includes: client computing device 114, proxy computing device 110, and server computing device 104, as described above with respect to FIG. 1. As further shown in FIG. 2, proxy computing device 110 includes proxy service 112, as described in FIG. 1, which includes a web page modifier 210, and a code injector 212. Web page modifier 210 receives a first web page 206. Code injector 212, which may optionally include code 214, injects code 214 into first web page 206 to generate a modified first web page 216. Web page modifier 210 outputs the modified first web page 216 for transmission to web browser 116 on client computing device 114. First web page 206 includes contents 208 while modified first web page 216 includes contents 208 along with code 214, as described further below.

As discussed above in reference to FIG. 1, proxy computing device 110 is communicatively interconnected between client computing device 114 and server computing device 104 via one or more networks (not pictured in FIG. 2). Proxy computing device 110 may establish itself as an intermediary for client computing device 114 and server computing device 104 in accordance with the process described above in reference to FIG. 1.

Proxy service 112 running on proxy computing device 110 may be configured to manage messages (e.g., requests and/or responses) sent between web browser 116 and web server 106. For example, proxy service 112 receives request 202 sent from web browser 116. In an embodiment, proxy service 112 may receive request 202 responsive to an identity provider having determined based on an access policy that requests from a user should be redirected to proxy service 112. For example, the identity provider may identify an access policy associated with a user of client computing device 114 and/or a policy associated with an application or service that the user is trying to access that indicates that interactions between the user and the application or service should be conducted via proxy service 112. As such, any requests sent from web browser 116 to web server 106 will be redirected to proxy service 112 during the user's active proxy session.

Web page modifier 210 of proxy service 112 may be configured to modify messages sent between web server 106 and web browser 116. For example, in response to receiving request 202 from web browser 116, proxy service 112 may issue a corresponding request 204 to web server 106, requesting that web server 106 fulfill request 202. Proxy service 112 then receives a response corresponding to request 204 from web server 106 that includes first web page 206. After receiving the response including first web page 206, web page modifier 210 may modify first web page 206 and send a response including a modified first web page 216 to web browser 116.

Code injector 212 of proxy service 112 may be configured to inject code 214 (e.g., JavaScript code) into first web page 206. Code 214, when executed by web browser 116, may cause web browser 116 to monitor actions of interest to proxy service 112, such as navigation actions, file download actions, file upload actions, asynchronous JavaScript and XML (AJAX) actions, and/or any other actions that may be executed by web browser 116 of client computing device 114 responsive to displaying modified first web page 216 and/or responsive to a user's interactions therewith.

Figure 3:
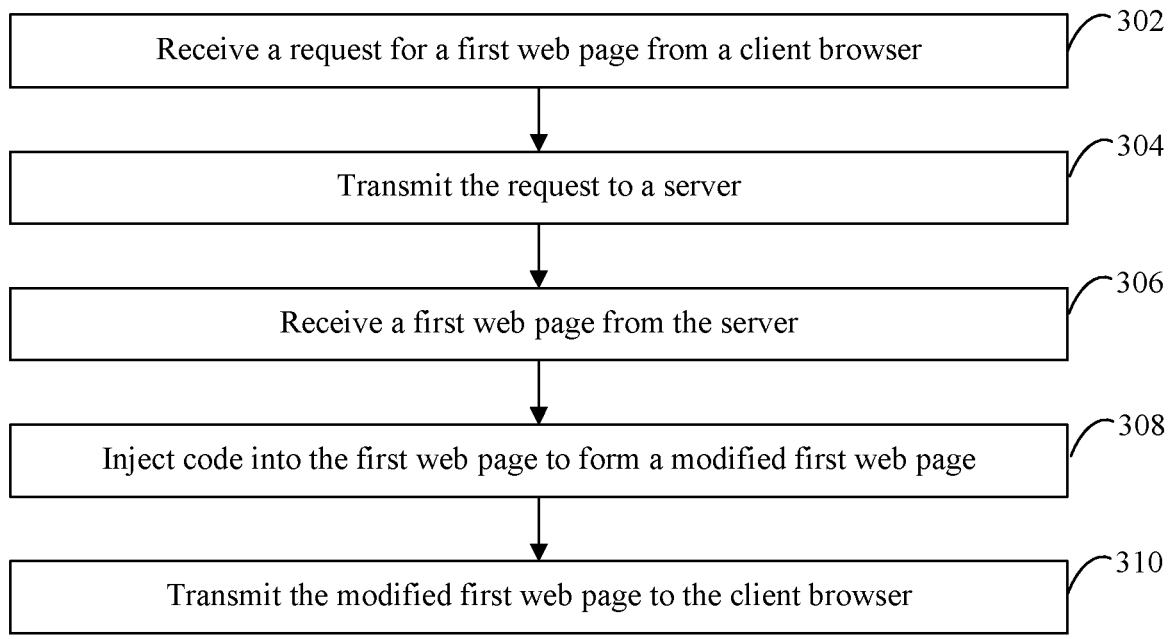
FIG. 3 depicts a flowchart of a process for modifying a web page, in accordance with an embodiment.

To further illustrate the foregoing features of proxy service 112, FIG. 3 is described. FIG. 3 depicts a flowchart 300 of a process for modifying a web page, in accordance with an embodiment. Proxy computing device 110 may operate according to flowchart 300 in embodiments. Note that not all steps of flowchart 300 need be performed in embodiments. Further structural and operational embodiments will be apparent to persons skilled in the relevant art(s) based on the following description of FIG. 3. FIG. 3 is described as follows with reference to system 200 of FIG. 2.

Flowchart 300 begins at step 302. In step 302, a request is received for a first web page from a client browser. For instance, proxy service 112, running on proxy computing device 110 may receive a request 202 from web browser 116 of computing device 104.

In step 304, the request is transmitted to a server. For instance, proxy service 112 on proxy computing device 110 may transmit request 204 to web server 106 on server computing device 104. In some embodiments, request 202 is transmitted unchanged, as request 204, to web server 106. In other embodiments, proxy service 112 may modify request 202 to form request 204.

In step 306, a first web page is received from the server. For instance, proxy service 112 running on proxy computing device 110 may receive first web page 206 from web server 106 of server computing device 104. First web page 206 may be received in response to proxy service 112 having sent request 204, although this is only an example. First web page 206 includes contents 208. In some embodiments, first web page 206 may also include, or link to, code (not shown) (e.g., JavaScript code) for providing dynamic content with respect to first web page 206.

In step 308, code is injected into the first web page to form a modified first web page. For instance, web page modifier 210, in conjunction with code injector 212, may inject code 214 into first web page 206 to generate modified first web page 216.

In step 310, the modified first web page is transmitted to the client browser. For instance, proxy service 112 running on proxy computing device 110 may transmit modified first web page 216 including injected code 214 to web browser 116 on client computing device 114. Code 214, when executed by web browser 116, may cause web browser 116 to monitor actions of interest to proxy service 112, such as navigation actions, file download actions, file upload actions, asynchronous Javascript and XML (AJAX) actions, and/or any other actions that may be executed by web browser 116 of client computing device 114 responsive to displaying modified first web page 216 and/or responsive to a user's interactions therewith.

III. Proxy-Side Conversion

Systems and methods described herein enable proxy server monitoring of client-side actions with respect to resources presented by a browser using a file viewer (e.g., PDF files). The proxy server injects code into a web page requested by the web browser to cause the web browser to mark a URL of an element that is created by the web page. If the proxy server encounters a request containing the marked URL, the proxy server examines the corresponding response to determine if the response includes a resource in a first format that is normally rendered by the web browser using a file viewer. If the response includes a resource in the first format, the proxy server converts the resource into a second format that is rendered by the client browser in a manner that permits the client browser to monitor user actions with respect to the resource on behalf of the proxy server. The proxy server then transmits to the client browser the resource in the second format for rendering thereby in lieu of the resource in the first format. For example, the proxy server may convert the resource into a byte array, generate a new web page that includes the byte array and additional code to cause the web browser to render the resource using the byte array, and then transmit the new web page to the web browser for rendering thereby.

Figure 4:
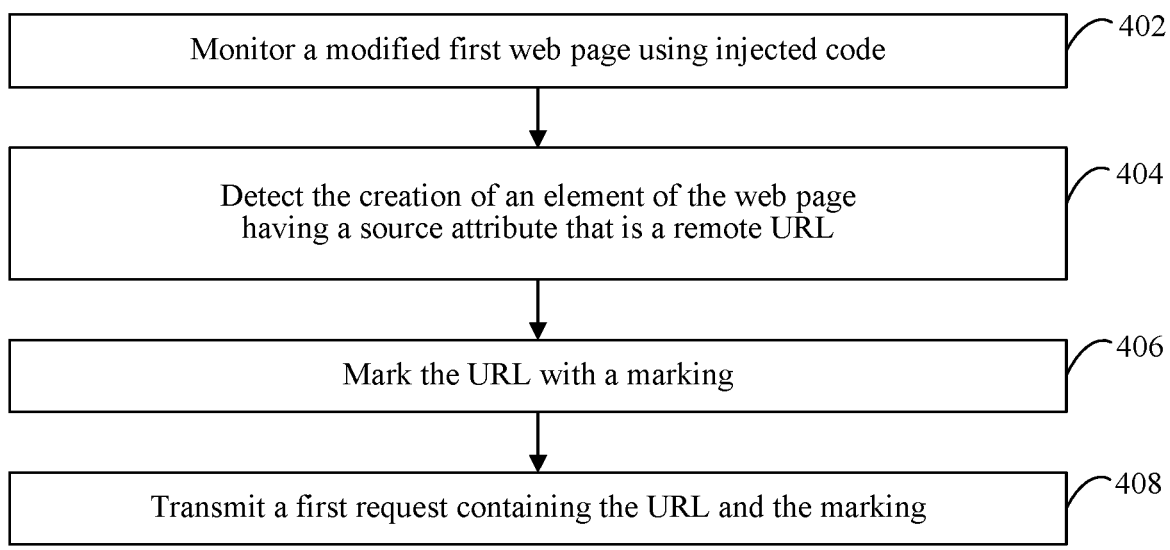
FIG. 4 depicts a flowchart of a process for monitoring a web page, in accordance with an embodiment.

To further illustrate the foregoing features of web browser 116, FIG. 4 is described. FIG. 4 depicts a flowchart 400 of a process for monitoring a web page, in accordance with an embodiment. Client computing device 114 may operate according to flowchart 400 in embodiments. Note that not all steps of flowchart 400 need be performed in embodiments. Further structural and operational embodiments will be apparent to persons skilled in the relevant art(s) based on the following description of FIG. 4. FIG. 4 is described as follows with reference to system 200 of FIG. 2.

Flowchart 400 begins at step 402. In step 402, a modified first web page is monitored using injected code. For instance, web browser 116 on client device 114 may execute injected code 214 in modified first web page 216 to monitor elements of modified first web page 216.

In step 404, the creation of an element of the web page having a source attribute that is a remote URL is detected. In embodiments described herein, code 214, when executed by web browser 116, may additionally cause web browser 116 to monitor and detect the creation of elements by web page 216 that include a source attribute that is a remote URL. For instance, web browser 116 on client device 114 may execute injected code 214 in modified first web page 216 to detect the creation of elements of modified web page 216 that have a source attribute that is a remote URL. Such elements may include a source (e.g., 'src') attribute that references a remote resource. Examples of such web page elements may include, but are not limited to, <iframe>, <object> and <embed> elements.

In step 406, the URL is marked with a marking. For instance, web browser 116 on client device 114 may execute injected code 214 in modified first web page 216 to mark the URL in the source attribute of the detected element with a marking. In some embodiments, web browser 116 may mark the URL by appending the marking to the URL in the source attribute of the detected element. In other embodiments, web browser 116 may mark the URL by modifying the URL in the source attribute of the detected element.

In step 408, a first request containing the URL and the marking is transmitted. For instance, when web browser 116 processes the detected element with the marked URL, web browser 116 may transmit a first request for the resource referenced by the marked URL to proxy service 112 on proxy computing device 110.

Figure 5:
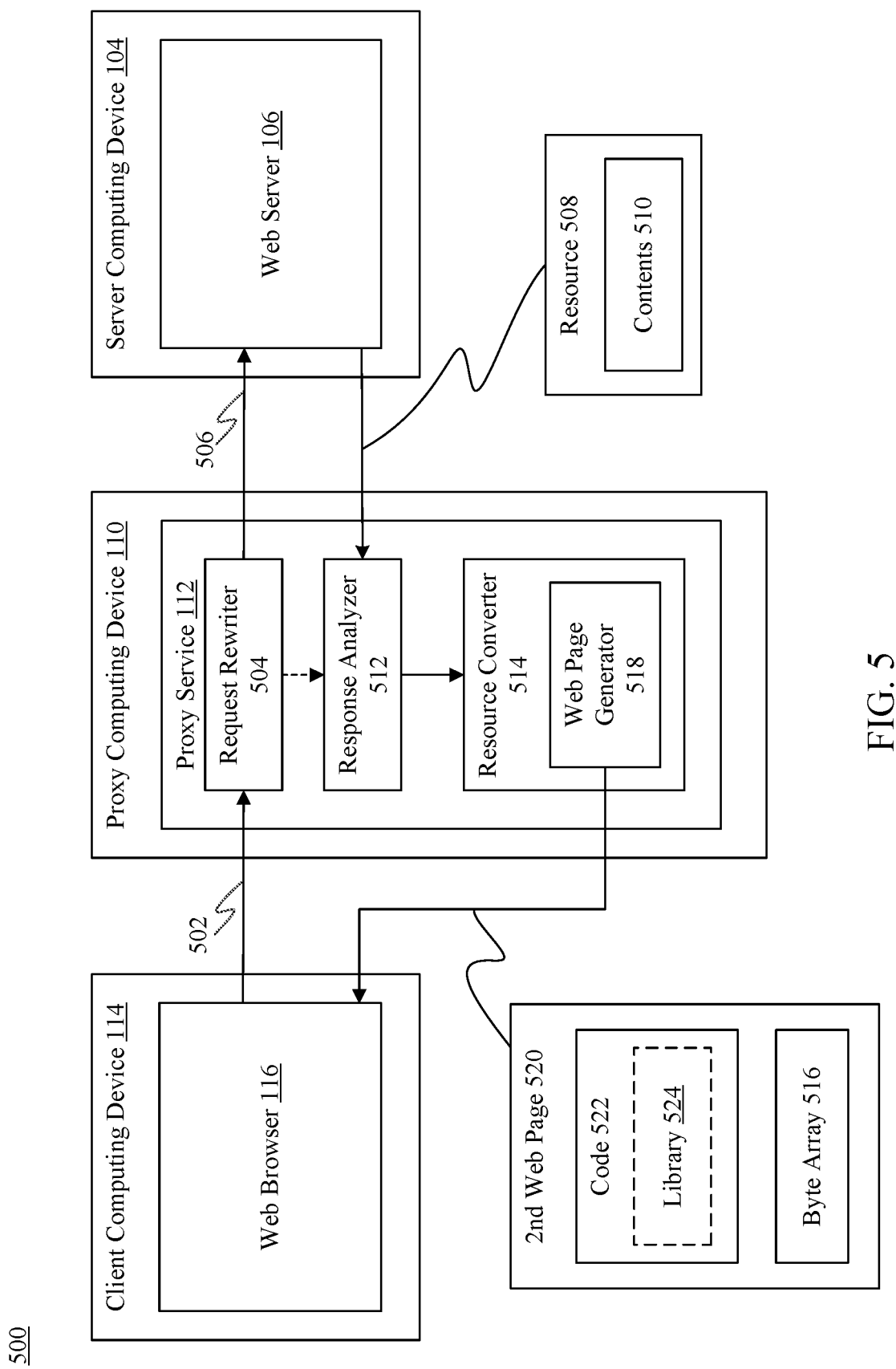
FIG. 5 depicts a block diagram of an example system in which a proxy computing device is interconnected between a client computing device and a server computing device, where the proxy computing device executes a proxy service, the client computing device executes a web browser, and the server computing device executes a web server, in accordance with an embodiment.

To help further illustrate the features of proxy service 112 in accordance with embodiments, FIG. 5 will now be described. In particular, FIG. 5 is a block diagram of an example system 500 in which a proxy computing device is interconnected between a client computing device and a server computing device, where the proxy computing device executes a proxy service, the client computing device executes a web browser, and the server computing device executes a web server, in accordance with an embodiment. As shown in FIG. 5, system 500 includes: client computing device 114, proxy computing device 110, and server computing device 104, as described above with respect to FIG. 1. As further shown in FIG. 5, proxy computing device 110 includes proxy service 112, as described in FIG. 1, which includes a request rewriter 504, a response analyzer 512, and a resource converter 514. Resource converter 514 may further include a web page generator 518.

Request rewriter 504 receives a first request 502 and determines whether the request includes a marked URL. If first request 502 includes a marked URL, request rewriter 504 extracts the marking from the marked URL to form a second request 506. Request rewriter 504 then transmits second request 506 to web server 106 on server computing device 104. Request rewriter 504 may optionally flag or otherwise inform response analyzer 512 that second request 506 corresponds to a request that included a marked URL (i.e., first request 502). Response analyzer 512 receives a response from web server 106 on server computing device 104, wherein the response includes a resource 508 that includes contents 510. Resource 508 may be a file (e.g., a PDF file) or any other type of web content (e.g., a web page).

Response analyzer 512 analyzes the response to determine if the response corresponds to a request that included a marked URL. If the response corresponds to a request that included a marked URL, response analyzer 512 analyzes resource 508 and/or contents 510 to determine whether resource 508 and/or contents 510 is a type that is handled by web browser 116 using a file viewer that limits the monitoring of actions with respect to the resource. In some embodiments, the content type may be determined by analyzing "content-type" field(s) in the header of the response, in resource 508, and/or in contents 510.

When the resource is a type that is handled by web browser 116 using a file viewer that limits the monitoring of actions with respect to the resource, resource converter 514 converts resource 508 and/or contents 510 into a byte array 516 (e.g., converts a PDF document into a byte array). Web page generator 518 may then generate a second web page 520 that includes code 522 and byte array 516. Code 522, when executed by web browser 116, will cause web browser 116 to render the contents 510 of resource 508 using byte array 516. In some embodiments, code 522 may additionally include, or link to, library 524. Library 524 includes code that is used to render the contents of the byte array using web page elements. In some embodiments, library 524 may render the contents onto an HTML5 <canvas> element using canvas drawing commands. Web page generator 518 may output second web page 520 for transmission to web browser 116 on client computing device 114.

Figure 6:
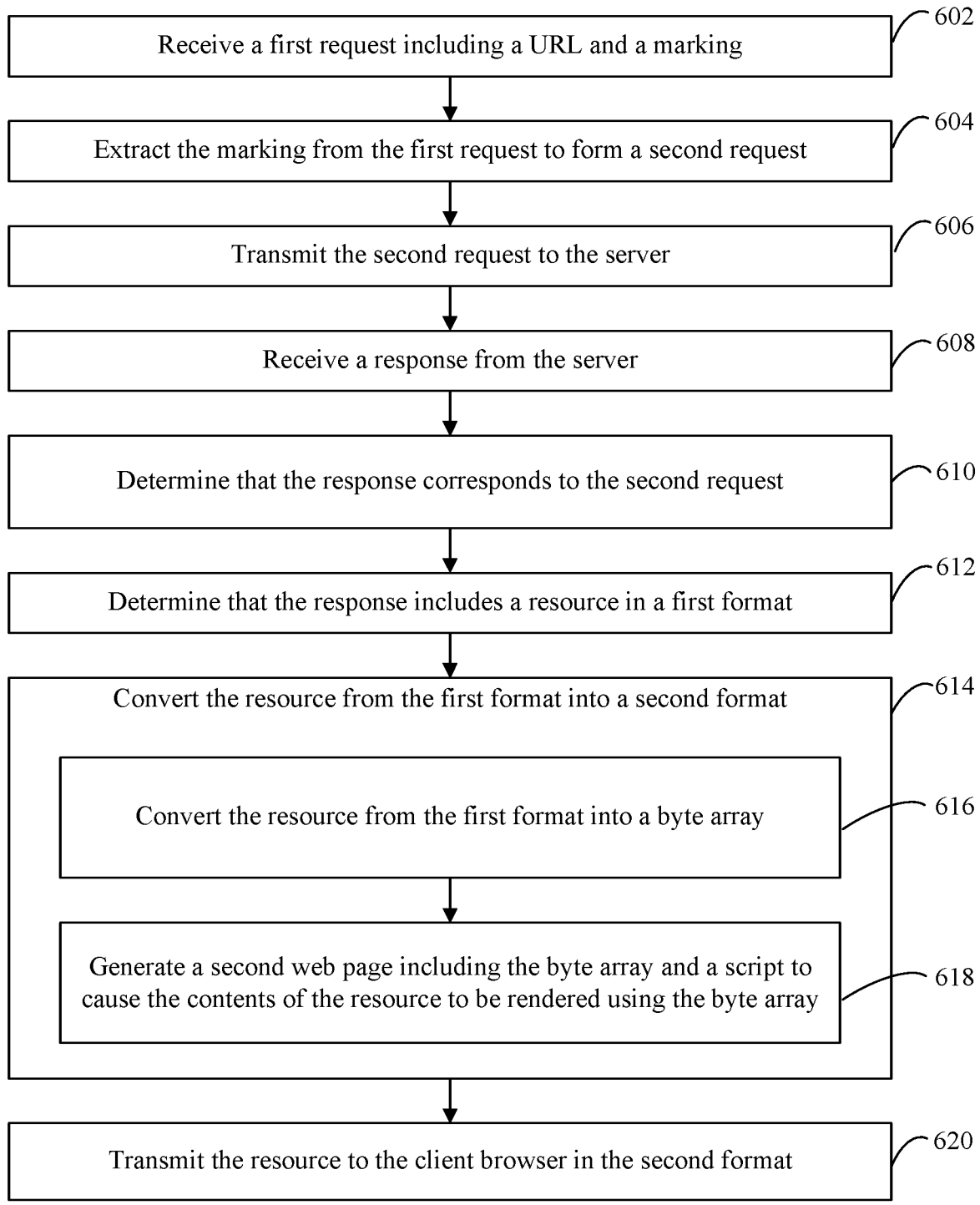
FIG. 6 depicts a flowchart of a process for converting a resource in a first format into a second format, in accordance with an embodiment.

To further illustrate the foregoing features of proxy service 112, FIG. 6 is described. FIG. 6 depicts a flowchart 600 of a process for converting a resource in a first format into a second format, in accordance with an embodiment. Proxy computing device 110 may operate according to flowchart 600 in embodiments. Note that not all steps of flowchart 600 need be performed in embodiments. Further structural and operational embodiments will be apparent to persons skilled in the relevant art(s) based on the following description of FIG. 6. FIG. 6 is described as follows with reference to system 500 of FIG. 5.

Flowchart 600 begins at step 602. In step 602, a first request including a URL and a marking is received. For instance, proxy service 112 on proxy computing device 110 may receive a first request 502 from web browser 116 on client computing device 114 that includes a URL and a marking.

In step 604, the marking is extracted from the first request to form a second request. For instance, request rewriter 504 may extract the marking from first request 502 to form second request 506.

In step 606, the second request is transmitted to the server. For instance, proxy service 112 may transmit second request 506 to web server 106 on web computing device 104.

In step 608, a response is received from the server. For instance, proxy service 112 on proxy computing device 110 may receive a response from web server 106 on web computing device 104. The response may include resource 508 that includes contents 510.

In step 610, it is determined whether the response corresponds to the second request. For instance, response analyzer 512 may analyze the response to determine whether it is the response to second request 506. In some embodiments, request rewriter 504 may flag or otherwise inform response analyzer 512 that second request 506 corresponds to a request that included a marked URL (i.e., first request 502). This information may aid response analyzer in determining whether it needs to further analyze resource 508 and/or contents 510.

In step 612, it is determined whether the response includes a resource that is in a first format. For instance, response analyzer 512 may analyze the response, resource 508 and/or contents 510 to determine whether the response includes a resource having content that is a type that is handled by web browser 116 using a file viewer that limits the monitoring of actions with respect to the resource. In some embodiments, the content type may be determined by analyzing "content-type" field(s) in the header of the response, in resource 508, and/or in content 510. In one embodiment, the first format is a PDF format and resource 508 is a PDF file.

In step 614, the resource is converted from the first format into a second format. For instance, resource converter 514 may convert resource 508 and/or contents 510 into a second format. Step 614 may be performed by performing steps 616 and 618.

In step 616, the resource is converted from the first format into a byte array. For instance, resource converter 514 may convert resource 508 and/or contents 510 into a byte array 516.

In step 618, a second web page including the byte array and a script is generated, the script to cause the contents of the resource to be rendered using the byte array. For instance, web page generator 518 may generate a second web page 520 that includes code 522 and byte array 516. Code 522 may be a script (e.g., JavaScript) that, when executed by browser 116 on client computing device 114, causes browser 116 to render resource 508 and/or contents 510 using byte array 516. In some embodiments, code 522 may additionally include, or link to, library 524. Library 524 includes code that is used to render the contents of the byte array using web page elements. In some embodiments, Library 524 may render the contents onto an HTML5 <canvas> element using canvas drawing commands.

In step 620, the resource is transmitted to the client browser in the second format. For instance, proxy service 112 on proxy computing device 110 may transmit the second web page 520 containing code 522 and byte array 516 to web browser 116 on client computing device 114.

Figure 7:
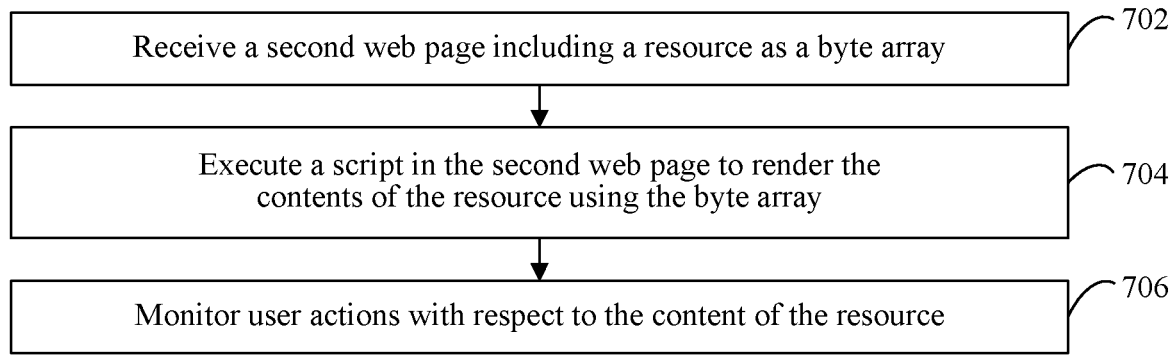
FIG. 7 depicts a flowchart of a process for rendering a resource using a byte array, in accordance with an embodiment.

To further illustrate the foregoing features of web browser 116, FIG. 7 is described. FIG. 7 depicts a flowchart 700 of a process for rendering a resource using a byte array, in accordance with an embodiment. Client computing device 114 may operate according to flowchart 700 in embodiments. Note that not all steps of flowchart 700 need be performed in embodiments. Further structural and operational embodiments will be apparent to persons skilled in the relevant art(s) based on the following description of FIG. 7. FIG. 7 is described as follows with reference to system 200 of FIG. 2 and 500 of FIG. 5.

Flowchart 700 begins at step 702. In step 702, a second web page including a byte array is received. For instance, web browser 116 on client computing device 114 receives, in response to first request 502, a second web page 520 that includes code 522 and byte array 516.

In step 704, a script in the second web page is executed to render the contents of the resource using the byte array. For instance, web browser 116 on client computing device 114 executes code 522 in the second web page 520 to render resource 508 and/or contents 510 using byte array 516. Code 522 may be a script (e.g., JavaScript) that, when executed by browser 116 on client computing device 114, causes browser 116 to render resource 508 and/or contents 510 using byte array 516. In some embodiments, code 522 may additionally include, or link to, library 524. Library 524 includes code that is used to render the contents of the byte array using web page elements. In some embodiments, library 524 may render the contents onto an HTML5 <canvas> element using canvas drawing commands. Because the resource is formatted as a byte array, web browser 116 on client computing device 114 does not recognize the resource as a type of resource that should be rendered using a file viewer.

In step 706, user actions with respect to the content of the resource are monitored. For instance, web browser 116 on client computing device 114 may execute injected code 214 to monitor actions occurring on the client-side. When resource 508 and/or contents 510 are rendered using code 522 and/or library 524, without using a file viewer, user actions with respect to resource 508 and/or contents 510 are visible to the injected code 214 executing on web browser 116. User actions that may be monitored with respect to resource 508 and/or contents 510 include, but are not limited to, clipboard actions (e.g., copy, cut and/or paste), editing actions, saving actions, downloading actions, printing actions, and/or screen capture actions.

Figure 8:
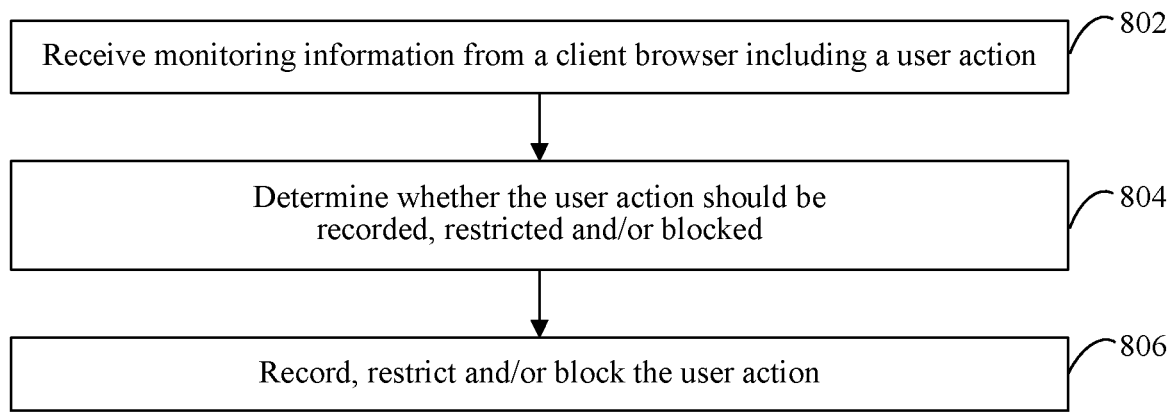
FIG. 8 depicts a flowchart of a process for monitoring user actions with respect to a web page, in accordance with an embodiment.

To further illustrate the foregoing features of proxy service 112, FIG. 8 is described. FIG. 8 depicts a flowchart 800 of a process for monitoring user actions with respect to a web page, in accordance with an embodiment. Proxy computing device 110 may operate according to flowchart 800 in embodiments. Note that not all steps of flowchart 800 need be performed in embodiments. Further structural and operational embodiments will be apparent to persons skilled in the relevant art(s) based on the following description of FIG. 8. FIG. 8 is described as follows with reference to system 200 of FIG. 2 and 500 of FIG. 5.

Flowchart 800 begins at step 802. In step 802, monitoring information including a user action is received from a client browser. For instance, proxy service 112 on proxy computing device 110 receives monitoring information from web browser 116 on client computing device 114. In some embodiments, injected code 214 and/or code 522, when executed by web browser 116, may cause web browser 116 to monitor client-side actions for user actions. When user actions are detected of interest are detected, web browser 116 transmits monitoring information identifying the user action to proxy service 112 on proxy computing device 110.

In step 804, it is determined whether the user action should be recorded, restricted and/or blocked. For instance, proxy service 112 on proxy computing device 110 may determine whether the user action should be recorded, restricted and/or blocked based on enforcement policies.

In step 806, the user action is recorded, restricted and/or blocked. For instance, proxy service 112 on proxy computing device 110 may, based on enforcement policies, record the user actions. A record of user actions may be useful for audit purposes or for learning user behavior to fine tune the enforcement policies. User actions may also be restricted and/or blocked. For example, a user action may be intercepted by proxy service 112 or proxy service 112 may cause the web browser to restrict, block, or simply ignore, the user action. User actions that may be recorded, restricted and/or blocked include, but are not limited to include, but are not limited to, clipboard actions (e.g., copy, cut and/or paste), editing actions, saving actions, downloading actions, printing actions, and/or screen capture actions.

IV. Client-Side Conversion

Systems and methods described herein enable proxy server monitoring of client-side actions with respect to PDF files. The proxy server injects code into a web page requested by the web browser to cause the web browser to monitor the web page for asynchronous requests. If the web browser detects, by executing the injected code, an asynchronous request, it marks the request to indicate to the proxy server to ignore the body of the response corresponding to the request. When the web browser receives a response, the web browser examines, by executing the injected code, the response to determine if the response includes a resource in a first format that is normally rendered by the web browser using a file viewer that limits monitoring of actions with respect to the resource. If the response includes a resource in the first format, the web browser, by executing the injected code, converts the resource into a second format that permits the monitoring of actions with respect to the resource. For example, the web browser, by executing the injected code, may convert the resource into a byte array and generate a new web page that includes the byte array and additional code to cause the web browser to render the resource using the byte array.

Figure 9:
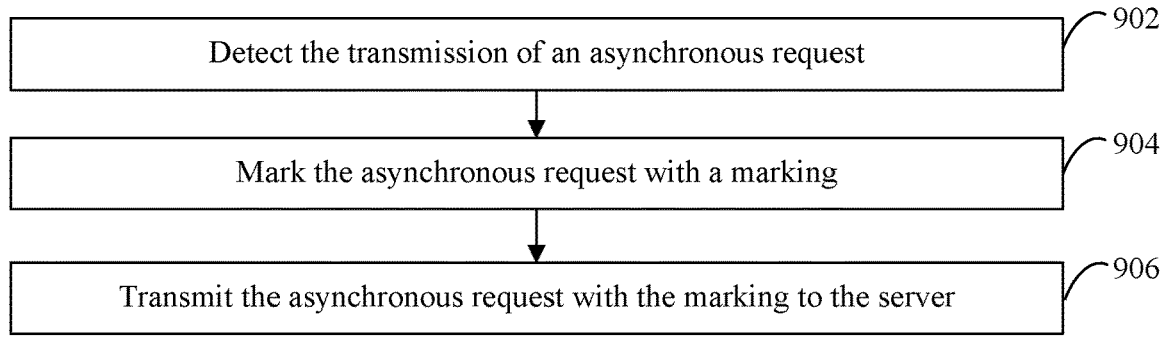
FIG. 9 depicts a flowchart of a process for monitoring a web page, in accordance with an embodiment.

To further illustrate the foregoing features of web browser 116, FIG. 9 is described. FIG. 9 depicts a flowchart 900 of a process for rendering a resource using a byte array, in accordance with an embodiment. Client computing device 114 may operate according to flowchart 900 in embodiments. Note that not all steps of flowchart 900 need be performed in embodiments. Further structural and operational embodiments will be apparent to persons skilled in the relevant art(s) based on the following description of FIG. 9. FIG. 9 is described as follows with reference to system 200 of FIG. 2.

Flowchart 900 begins at step 902. In step 902, the transmission of an asynchronous request is detected. For instance, web browser 116 on client computing device 114, by executing injected code 214, may monitor and detect the transmission of an asynchronous request. An asynchronous request may include, but is not limited to, XMLHttpRequests (XHR) and/or fetch API requests.

In step 904, the asynchronous request is marked with a marking. For instance, web browser 116 on client computing device 114, by executing injected code 214, may mark the detected asynchronous request with a marking to indicate to the proxy server to ignore the body of the response corresponding to the request.

In step 906, the asynchronous request with the marking is transmitted to the server. For instance, web browser 116 on client computing device 114, by executing injected code 214, may transmit the detected asynchronous request along with the marking to proxy service 112 on proxy computing device 110.

Figure 10:
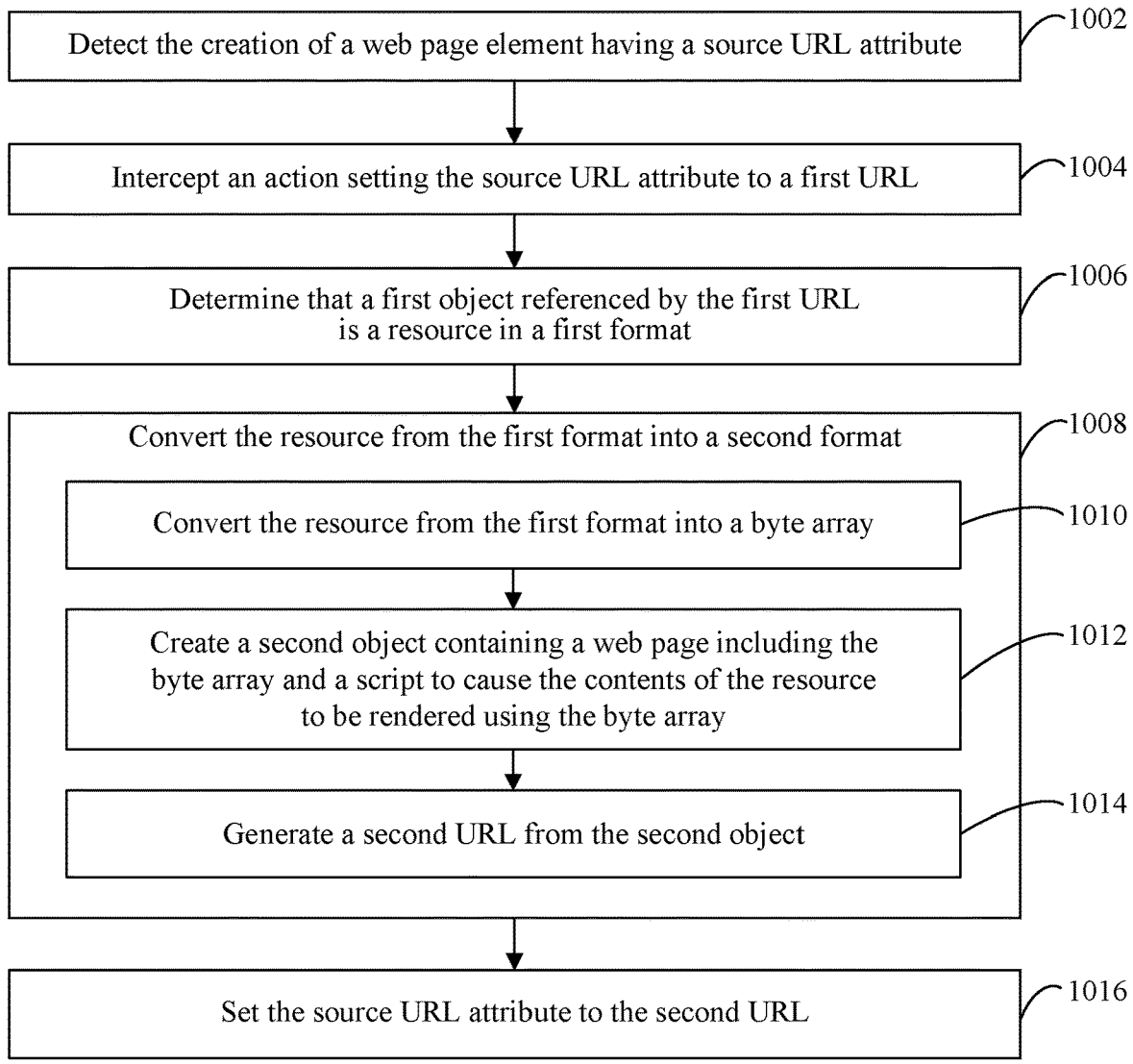
FIG. 10 depicts a flowchart of a process for converting a resource in a first format into a second format, in accordance with an embodiment.

To further illustrate the foregoing features of web browser 116, FIG. 10 is described. FIG. 10 depicts a flowchart 1000 of a process for rendering a resource using a byte array, in accordance with an embodiment. Client computing device 114 may operate according to flowchart 1000 in embodiments. Note that not all steps of flowchart 1000 need be performed in embodiments. Further structural and operational embodiments will be apparent to persons skilled in the relevant art(s) based on the following description of FIG. 10. FIG. 10 is described as follows with reference to system 200 of FIG. 2.

Flowchart 1000 begins at step 1002. In step 1002, the creation of a web page element having a source URL attribute is detected. For instance, web browser 116 on client computing device 114, by executing injected code 214, may detect the creation of a web page element that includes a source URL attribute. Such elements may include a source (e.g., 'src') attribute that references a remote resource. Examples of such web page elements may include, but are not limited to, <iframe>, <object> and <embed> elements.

In step 1004, an action setting the source URL of attribute to a first URL is intercepted. For instance, web browser 116 on client computing device 114, by executing injected code 214, may intercept an action by the modified first web page 216 to set the source URL attribute of the detected web page element.

In step 1006, it is determined that a first object referenced by the first URL is a resource in a first format. For instance, web browser 116 on client computing device 114, by executing injected code 214, may analyze the contents of the first object referenced by the first URL to determine whether the first object includes a resource having content that is a type that is handled by web browser 116 using a file viewer that limits the monitoring of actions with respect to the resource. In some embodiments, the content type may be determined by analyzing "content-type" field(s) in the first object.

In step 1008, the resource is converted from the first format into a second format. For instance, web browser 116 on client computing device 114, by executing injected code 214, may convert the first object into a resource having a second format. Step 1008 may be performed by performing steps 1010, 1012 and/or 1014.

In step 1010, the resource is converted from the first format into a byte array. For instance, web browser 116 on client computing device 114, by executing injected code 214, may convert the first object into a byte array.

In step 1012, a second object containing a web page including the byte array and a script is generated, the script to cause the contents of the resource to be rendered using the byte array. For instance, web browser 116 on client computing device 114, by executing injected code 214, may generate a second object including a web page that includes a script and the byte array. The script (e.g., JavaScript), when executed by browser 116 on client computing device 114, causes browser 116 to render the contents of the first object using the byte array. In some embodiments, the script may additionally include, or link to, library that is used to render the contents of the byte array using web page elements. In some embodiments, the library may render the contents onto an HTML5<canvas> element using canvas drawing commands.

In step 1014, a second URL is generated from the second object. For instance, web browser 116 on client computing device 114, by executing injected code 214, may generate a second URL that references the second object. The second URL may be a local URL that references the second object that is stored locally on client computing device 114.

In step 1016, the source URL attribute is set to the second URL. For instance, web browser 116 on client computing device 114, by executing injected code 214, may set the URL attribute of the detected web page element to the second URL instead of the first URL. This causes web browser 116 to render the contents of the resource using the web page in the second object referenced by the second URL instead of the first object referenced by the first URL. Because the resource is formatted as a byte array, web browser 116 on client computing device 114 does not recognize the resource as a type of resource that should be rendered using a file viewer.

V. Example Mobile Device and Computer System Implementation

The systems and methods described above in reference to FIGS. 1-10, including cloud services network 102, server computing device 104, web server 106, identity provider 108, proxy computing device 110, proxy service 112, client computing device 114, web browser 116, web page modifier 210, code injector 212, request rewriter 504, response analyzer 512, resource converter 514, web page generator 518, and/or each of the components described therein, and the steps of flowcharts 300, 400, 600, 700, 800, 900 and 1000 may be implemented in hardware, or hardware combined with one or both of software and/or firmware. For example, cloud services network 102, server computing device 104, web server 106, identity provider 108, proxy computing device 110, proxy service 112, client computing device 114, web browser 116, web page modifier 210, code injector 212, request rewriter 504, response analyzer 512, resource converter 514, web page generator 518, and/or each of the components described therein, and the steps of flowcharts 300, 400, 600, 700, 800, 900 and 1000 may be each implemented as computer program code/instructions configured to be executed in one or more processors and stored in a computer readable storage medium. Alternatively, cloud services network 102, server computing device 104, web server 106, identity provider 108, proxy computing device 110, proxy service 112, client computing device 114, web browser 116, web page modifier 210, code injector 212, request rewriter 504, response analyzer 512, resource converter 514, web page generator 518, and/or each of the components described therein, and steps of flowcharts 300, 400, 600, 700, 800, 900 and 1000 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 11:
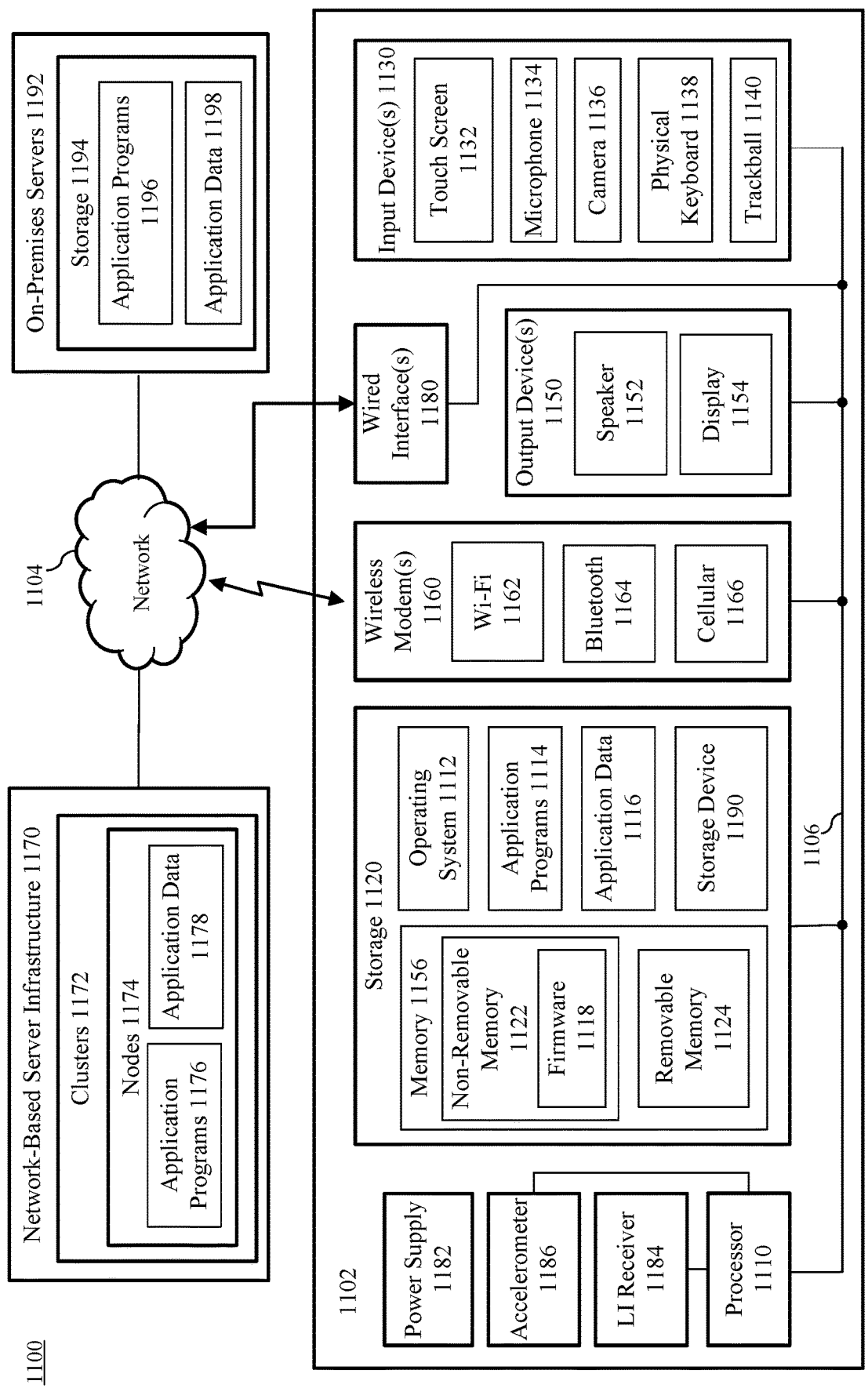
FIG. 11 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices, such as system 100 of FIG. 1, in which embodiments may be implemented are described as follows with respect to FIG. 11. FIG. 11 shows a block diagram of an exemplary computing environment 1100 that includes a computing device 1102. In some embodiments, computing device 1102 is communicatively coupled with devices (not shown in FIG. 11) external to computing environment 1100 via network 1104. Network 1104 comprises one or more networks such as local area networks (LANs), wide area networks (WANs), enterprise networks, the Internet, etc., and may include one or more wired and/or wireless portions. Network 1104 may additionally or alternatively include a cellular network for cellular communications. Computing device 1102 is described in detail as follows Computing device 1102 can be any of a variety of types of computing devices. For example, computing device 1102 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1102 may alternatively be a stationary computing device such as a desktop computer, a personal computer (PC), a stationary server device, a minicomputer, a mainframe, a supercomputer, etc.

As shown in FIG. 11, computing device 1102 includes a variety of hardware and software components, including a processor 1110, a storage 1120, one or more input devices 1130, one or more output devices 1150, one or more wireless modems 1160, one or more wired interfaces 1180, a power supply 1182, a location information (LI) receiver 1184, and an accelerometer 1186. Storage 1120 includes memory 1156, which includes non-removable memory 1122 and removable memory 1124, and a storage device 1190. Storage 1120 also stores an operating system 1112, application programs 1114, and application data 1116. Wireless modem(s) 1160 include a WI-FI modem 1162, a BLUETOOTH modem 1164, and a cellular modem 1166. Output device(s) 1150 includes a speaker 1152 and a display 1154. Input device(s) 1130 includes a touch screen 1132, a microphone 1134, a camera 1136, a physical keyboard 1138, and a trackball 1140. Not all components of computing device 1102 shown in FIG. 11 are present in all embodiments, additional components not shown may be present, and any combination of the components may be present in a particular embodiment. These components of computing device 1102 are described as follows.

A single processor 1110 (e.g., central processing unit (CPU), microcontroller, a microprocessor, signal processor, ASIC (application specific integrated circuit), and/or other physical hardware processor circuit) or multiple processors 1110 may be present in computing device 1102 for performing such tasks as program execution, signal coding, data processing, input/output processing, power control, and/or other functions. Processor 1110 may be a single-core or multi-core processor, and each processor core may be single-threaded or multithreaded (to provide multiple threads of execution concurrently). Processor 1110 is configured to execute program code stored in a computer readable medium, such as program code of operating system 1112 and application programs 1114 stored in storage 1120. Operating system 1112 controls the allocation and usage of the components of computing device 1102 and provides support for one or more application programs 1114 (also referred to as "applications" or "apps"). Application programs 1114 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1102 can communicate with any other component according to function, although not all connections are shown for case of illustration. For instance, as shown in FIG. 11, bus 1106 is a multiple signal line communication medium (e.g., conductive traces in silicon, metal traces along a motherboard, wires, etc.) that may be present to communicatively couple processor 1110 to various other components of computing device 1102, although in other embodiments, an alternative bus, further buses, and/or one or more individual signal lines may be present to communicatively couple components. Bus 1106 represents one or more of any of several types of bus structures, including a memory bus or memory controller, a peripheral bus, an accelerated graphics port, and a processor or local bus using any of a variety of bus architectures.

Storage 1120 is physical storage that includes one or both of memory 1156 and storage device 1190, which store operating system 1112, application programs 1114, and application data 1116 according to any distribution. Non-removable memory 1122 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1122 may include main memory and may be separate from or fabricated in a same integrated circuit as processor 1110. As shown in FIG. 11, non-removable memory 1122 stores firmware 1118, which may be present to provide low-level control of hardware. Examples of firmware 1118 include BIOS (Basic Input/Output System, such as on personal computers) and boot firmware (e.g., on smart phones). Removable memory 1124 may be inserted into a receptacle of or otherwise coupled to computing device 1102 and can be removed by a user from computing device 1102. Removable memory 1124 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1190 may be present that are internal and/or external to a housing of computing device 1102 and may or may not be removable. Examples of storage device 1190 include a hard disk drive, a SSD, a thumb drive (e.g., a USB (Universal Serial Bus) flash drive), or other physical storage device.

One or more programs may be stored in storage 1120. Such programs include operating system 1112, one or more application programs 1114, and other program modules and program data. Examples of such application programs may include, for example, computer program logic (e.g., computer program code/instructions) for implementing one or more of cloud services network 102, server computing device 104, web server 106, identity provider 108, proxy computing device 110, proxy service 112, client computing device 114, web browser 116, web page modifier 210, code injector 212, request rewriter 504, response analyzer 512, resource converter 514, web page generator 518, and/or each of the components described therein, along with any components and/or subcomponents thereof, as well as the flowcharts/flow diagrams (e.g., flowcharts 300, 400, 600, 700, 800, 900 and/or 1000) described herein, including portions thereof, and/or further examples described herein.

Storage 1120 also stores data used and/or generated by operating system 1112 and application programs 1114 as application data 1116. Examples of application data 1116 include web pages, text, images, tables, sound files, video data, and other data, which may also be sent to and/or received from one or more network servers or other devices via one or more wired or wireless networks. Storage 1120 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1102 through one or more input devices 1130 and may receive information from computing device 1102 through one or more output devices 1150. Input device(s) 1130 may include one or more of touch screen 1132, microphone 1134, camera 1136, physical keyboard 1138 and/or trackball 1140 and output device(s) 1150 may include one or more of speaker 1152 and display 1154. Each of input device(s) 1130 and output device(s) 1150 may be integral to computing device 1102 (e.g., built into a housing of computing device 1102) or external to computing device 1102 (e.g., communicatively coupled wired or wirelessly to computing device 1102 via wired interface(s) 1180 and/or wireless modem(s) 1160). Further input devices 1130 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1154 may display information, as well as operating as touch screen 1132 by receiving user commands and/or other information (e.g., by touch, finger gestures, virtual keyboard, etc.) as a user interface. Any number of each type of input device(s) 1130 and output device(s) 1150 may be present, including multiple microphones 1134, multiple cameras 1136, multiple speakers 1152, and/or multiple displays 1154.

One or more wireless modems 1160 can be coupled to antenna(s) (not shown) of computing device 1102 and can support two-way communications between processor 1110 and devices external to computing device 1102 through network 1104, as would be understood to persons skilled in the relevant art(s). Wireless modem 1160 is shown generically and can include a cellular modem 1166 for communicating with one or more cellular networks, such as a GSM network for data and voice communications within a single cellular network, between cellular networks, or between the mobile device and a public switched telephone network (PSTN). Wireless modem 1160 may also or alternatively include other radio-based modem types, such as a BLUETOOTH modem 1164 (also referred to as a "BLUETOOTH device") and/or WI-FI 1162 modem (also referred to as an "wireless adaptor"). WI-FI modem 1162 is configured to communicate with an access point or other remote WI-FI-capable device according to one or more of the wireless network protocols based on the IEEE (Institute of Electrical and Electronics Engineers) 802.11 family of standards, commonly used for local area networking of devices and Internet access. BLUETOOTH modem 1164 is configured to communicate with another BLUETOOTH-capable device according to the BLUETOOTH short-range wireless technology standard(s) such as IEEE 802.15.1 and/or managed by the BLUETOOTH Special Interest Group (SIG).

Computing device 1102 can further include power supply 1182, LI receiver 1184, accelerometer 1186, and/or one or more wired interfaces 1180. Example wired interfaces 1180 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1180 of computing device 1102 provide for wired connections between computing device 1102 and network 1104, or between computing device 1102 and one or more devices/peripherals when such devices/peripherals are external to computing device 1102 (e.g., a pointing device, display 1154, speaker 1152, camera 1136, physical keyboard 1138, etc.). Power supply 1182 is configured to supply power to each of the components of computing device 1102 and may receive power from a battery internal to computing device 1102, and/or from a power cord plugged into a power port of computing device 1102 (e.g., a USB port, an A/C power port). LI receiver 1184 may be used for location determination of computing device 1102 and may include a satellite navigation receiver such as a Global Positioning System (GPS) receiver or may include other type of location determiner configured to determine location of computing device 1102 based on received information (e.g., using cell tower triangulation, etc.). Accelerometer 1186 may be present to determine an orientation of computing device 1102.

Note that the illustrated components of computing device 1102 are not required or all-inclusive, and fewer or greater numbers of components may be present as would be recognized by one skilled in the art. For example, computing device 1102 may also include one or more of a gyroscope, barometer, proximity sensor, ambient light sensor, digital compass, etc. Processor 1110 and memory 1156 may be co-located in a same semiconductor device package, such as being included together in an integrated circuit chip, FPGA, or system-on-chip (SOC), optionally along with further components of computing device 1102.

In embodiments, computing device 1102 is configured to implement any of the above-described features of flowcharts herein. Computer program logic for performing any of the operations, steps, and/or functions described herein may be stored in storage 1120 and executed by processor 1110.

In some embodiments, server infrastructure 1170 may be present in computing environment 1100 and may be communicatively coupled with computing device 1102 via network 1104. Server infrastructure 1170, when present, may be a network-accessible server set (e.g., a cloud-based environment or platform). As shown in FIG. 11, server infrastructure 1170 includes clusters 1172. Each of clusters 1172 may comprise a group of one or more compute nodes and/or a group of one or more storage nodes. For example, as shown in FIG. 11, cluster 1172 includes nodes 1174. Each of nodes 1174 are accessible via network 1104 (e.g., in a "cloud-based" embodiment) to build, deploy, and manage applications and services. Any of nodes 1174 may be a storage node that comprises a plurality of physical storage disks, SSDs, and/or other physical storage devices that are accessible via network 1104 and are configured to store data associated with the applications and services managed by nodes 1174. For example, as shown in FIG. 11, nodes 1174 may store application data 1178.

Each of nodes 1174 may, as a compute node, comprise one or more server computers, server systems, and/or computing devices. For instance, a node 1174 may include one or more of the components of computing device 1102 disclosed herein. Each of nodes 1174 may be configured to execute one or more software applications (or "applications") and/or services and/or manage hardware resources (e.g., processors, memory, etc.), which may be utilized by users (e.g., customers) of the network-accessible server set. For example, as shown in FIG. 11, nodes 1174 may operate application programs 1176. In an implementation, a node of nodes 1174 may operate or comprise one or more virtual machines, with each virtual machine emulating a system architecture (e.g., an operating system), in an isolated manner, upon which applications such as application programs 1176 may be executed.

In an embodiment, one or more of clusters 1172 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1172 may be a datacenter in a distributed collection of datacenters. In embodiments, exemplary computing environment 1100 comprises part of a cloud-based platform such as Amazon Web Services® of Amazon Web Services, Inc. or Google Cloud Platform™ of Google LLC, although these are only examples and are not intended to be limiting.

In an embodiment, computing device 1102 may access application programs 1176 for execution in any manner, such as by a client application and/or a browser at computing device 1102. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1102 may additionally and/or alternatively synchronize copies of application programs 1114 and/or application data 1116 to be stored at network-based server infrastructure 1170 as application programs 1176 and/or application data 1178. For instance, operating system 1112 and/or application programs 1114 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1120 at network-based server infrastructure 1170.

In some embodiments, on-premises servers 1192 may be present in computing environment 1100 and may be communicatively coupled with computing device 1102 via network 1104. On-premises servers 1192, when present, are hosted within an organization's infrastructure and, in many cases, physically onsite of a facility of that organization. On-premises servers 1192 are controlled, administered, and maintained by IT (Information Technology) personnel of the organization or an IT partner to the organization. Application data 1198 may be shared by on-premises servers 1192 between computing devices of the organization, including computing device 1102 (when part of an organization) through a local network of the organization, and/or through further networks accessible to the organization (including the Internet). Furthermore, on-premises servers 1192 may serve applications such as application programs 1196 to the computing devices of the organization, including computing device 1102. Accordingly, on-premises servers 1192 may include storage 1194 (which includes one or more physical storage devices such as storage disks and/or SSDs) for storage of application programs 1196 and application data 1198 and may include one or more processors for execution of application programs 1196. Still further, computing device 1102 may be configured to synchronize copies of application programs 1114 and/or application data 1116 for backup storage at on-premises servers 1192 as application programs 1196 and/or application data 1198.

Embodiments described herein may be implemented in one or more of computing device 1102, network-based server infrastructure 1170, and on-premises servers 1192. For example, in some embodiments, computing device 1102 may be used to implement systems, clients, or devices, or components/subcomponents thereof, disclosed elsewhere herein. In other embodiments, a combination of computing device 1102, network-based server infrastructure 1170, and/or on-premises servers 1192 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk. SSD, other physical hardware media such as RAMs, ROMs, flash memory, digital video disks, zip disks, MEMs (microelectronic machine) memory, nanotechnology-based storage devices, and further types of physical/tangible hardware storage media of storage 1120. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1114) may be stored in storage 1120. Such computer programs may also be received via wired interface(s) 1180 and/or wireless modem(s) 1160 over network 1104. Such computer programs, when executed or loaded by an application, enable computing device 1102 to implement features of embodiments discussed herein.

Accordingly, such computer programs represent controllers of the computing device 1102.

Embodiments are also directed to computer program products comprising computer code or instructions stored on any computer-readable medium or computer-readable storage medium. Such computer program products include the physical storage of storage 1120 as well as further physical storage types.

VI. Additional Example Embodiments

In an embodiment, a method, performed by a proxy server, including: receiving a first web page from a server; injecting program instructions into the first web page, the program instructions being configured to cause a client browser to: monitor user actions with respect to content of the first web page on behalf of the proxy server, detect the creation of an element of the first web page having a source that is a remote URL, and mark the URL with a marking based on the detection; transmitting the first web page to the client browser; receiving from the client browser a request that includes the URL and the marking; extracting the marking from the request and transmitting the request to the server; receiving, from the server, a response that includes a resource identified by the URL; determining that the response corresponds to the request; determining that the resource is in a first format that is rendered by the client browser using a file viewer that prevents the client browser from monitoring user actions with respect to the resource on behalf of the proxy server; responsive to the determining that the response corresponds to the request and the determining that the resource is in the first format: converting the resource from the first format to a second format that is rendered by the client browser in a manner that permits the client browser to monitor user actions with respect to the resource on behalf of the proxy server; and transmitting, to the client browser, the resource in the second format.

In an embodiment, the method further includes: receiving monitoring information from the client browser regarding a user action with respect to the resource; and blocking an event associated with the user action based at least on the monitoring information.

In an embodiment, the event comprises one of: copying a content of the resource; editing the resource; saving the resource; printing the resource; or downloading the resource.

In an embodiment, the element of the first web page comprises one of: an iframe HTML element; an object HTML element; or an embed HMTL element.

In an embodiment, the marking the URL comprises one of modifying the URL or appending the marking to the URL.

In an embodiment, the first format is a Portable Document Format (PDF), and the resource is a PDF file.

In an embodiment, the converting the resource from the first format to the second format comprises: converting the resource from the first format into a byte array; and generating a second web page that includes a script that when executed by the client browser causes the client browser to render the contents of the resource using the byte array; and wherein transmitting, to the client browser, the resource in the second format comprises: transmitting the second web page to the client browser.

In another embodiment, a system comprises: a processor; and a memory having computer-executable instructions stored thereon that, when executed by a processor, causes the processor to: receive a first web page from a server; inject program instructions into the first web page, the program instructions being configured to cause a client browser to: monitor user actions with respect to content of the first web page on behalf of the proxy server, detect the creation of an element of the first web page having a source that is a remote URL, and mark the URL with a marking based on the detection; transmit the first web page to the client browser; receive from the client browser a request that includes the URL and the marking; extract the marking from the request and transmit the request to the server; receive, from the server, a response that includes a resource identified by the URL; determine that the response corresponds to the request; determine that the resource is in a first format that is rendered by the client browser using a file viewer that prevents the client browser from monitoring user actions with respect to the resource on behalf of the proxy server; responsive to the determining that the response corresponds to the request and the determining that the resource is in the first format: convert the resource from the first format to a second format that is rendered by the client browser in a manner that permits the client browser to monitor user actions with respect to the resource on behalf of the proxy server; and transmit, to the client browser, the resource in the second format.

In an embodiment, the instructions, when executed by the processor, further causes the system to: receive monitoring information from the client browser regarding a user action with respect to the resource; and block an event associated with the user action based at least on the monitoring information.

In an embodiment, the event comprises one of: copying a content of the resource; editing the resource; saving the resource; printing the resource; or downloading the resource.

In an embodiment, the element of the first web page comprises one of: an iframe HTML element; an object HTML element; or an embed HMTL element.

In an embodiment, the marking the URL comprises one of modifying the URL or appending the marking to the URL.

In an embodiment, the first format is a Portable Document Format (PDF), and the resource is a PDF file.

In an embodiment, the converting the resource from the first format to the second format comprises: converting the resource from the first format into a byte array; and generating a second web page that includes a script that when executed by the client browser causes the client browser to render the contents of the resource using the byte array; and wherein transmitting, to the client browser, the resource in the second format comprises: transmitting the second web page to the client browser.

In another embodiment, a computer-readable storage medium has computer-executable instructions stored thereon that, when executed by a processor, causes a processor to: receive a first web page from a server; inject program instructions into the first web page, the program instructions being configured to cause a client browser to: monitor user actions with respect to content of the first web page on behalf of the proxy server, detect the creation of an element of the first web page having a source that is a remote URL, and mark the URL with a marking based on the detection; transmit the first web page to the client browser; receive from the client browser a request that includes the URL and the marking; extract the marking from the request and transmit the request to the server; receive, from the server, a response that includes a resource identified by the URL; determine that the response corresponds to the request; determine that the resource is in a first format that is rendered by the client browser using a file viewer that prevents the client browser from monitoring user actions with respect to the resource on behalf of the proxy server; responsive to the determining that the response corresponds to the request and the determining that the resource is in the first format: convert the resource from the first format to a second format that is rendered by the client browser in a manner that permits the client browser to monitor user actions with respect to the resource on behalf of the proxy server; and transmit, to the client browser, the resource in the second format.

In an embodiment, the instructions, when executed by the processor, further causes the system to: receive monitoring information from the client browser regarding a user action with respect to the resource; and block an event associated with the user action based at least on the monitoring information.

In an embodiment, the event comprises one of: copying a content of the resource; editing the resource; saving the resource; printing the resource; or downloading the resource.

In an embodiment, the element of the first web page comprises one of: an iframe HTML element; an object HTML element; or an embed HMTL element.

In an embodiment, the marking the URL comprises one of modifying the URL or appending the marking to the URL.

In an embodiment, the first format is a Portable Document Format (PDF), and the resource is a PDF file.

In an embodiment, the converting the resource from the first format to the second format comprises: converting the resource from the first format into a byte array; and generating a second web page that includes a script that when executed by the client browser causes the client browser to render the contents of the resource using the byte array; and wherein transmitting, to the client browser, the resource in the second format comprises: transmitting the second web page to the client browser.

VII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method, performed by a proxy server, comprising:
receiving a first web page from a web server;
injecting a client-side script into the first web page to form a modified first web page, the client-side script being configured to cause a client browser to:
    detect client-side creation of a markup language element in the modified first web page having a source uniform resource locator (URL) that references a remote resource, and
    mark, responsive to detecting client-side creation of the markup language element, the URL by modifying the URL to include a marking;
transmitting the modified first web page to the client browser;
receiving from the client browser a first request that includes the URL and the marking;
extracting the marking from the first request to form a second request and transmitting the second request to the web server;
receiving, from the web server, a response that includes a resource identified by the URL;
determining that the response corresponds to the second request;
determining that the resource is in a first format that limits the ability of the proxy server to monitor user actions with respect to the resource through the client browser;
responsive to the determining that the response corresponds to the second request and the determining that the resource is in the first format:
    converting the resource from the first format to a second format that enables the proxy server to monitor user actions with respect to the resource through the client browser; and
    transmitting, to the client browser, the resource in the second format.

2. The method of claim 1, further comprising:
receiving monitoring information from the client browser regarding a user action with respect to the resource; and
blocking an event associated with the user action based at least on the monitoring information.

3. The method of claim 2, wherein the event comprises one of:
copying a content of the resource;
editing the resource;
saving the resource;
printing the resource; or
downloading the resource.

4. The method of claim 1, wherein the markup language element of the first web page comprises one of:
an iframe HTML element;
an object HTML element; or
an embed HMTL element.

5. The method of claim 1, wherein marking the URL comprises appending the marking to the URL.

6. The method of claim 1, wherein the first format is a Portable Document Format (PDF), and the resource is a PDF file.

7. The method of claim 1, wherein converting the resource from the first format to the second format comprises:
  converting the resource from the first format into a byte array; and
  generating a second web page that includes a script that, when executed by the client browser, causes the client browser to render the contents of the resource using the byte array; and
  wherein transmitting, to the client browser, the resource in the second format comprises:
  transmitting the second web page to the client browser.

8. A system comprising:
  a processor; and
  a memory having computer-executable instructions stored thereon that, when executed by a processor, causes the processor to:
    receive a first web page from a web server;
    inject a client-side script into the first web page to form a modified first web page, the client-side script being configured to cause a client browser to:
      detect client-side creation of a markup language element in the modified first web page having a source uniform resource locator (URL) that references a remote resource, and
      mark, responsive to detecting client-side creation of the markup language element, the URL to include a marking;
    transmit the modified first web page to the client browser;
    receive from the client browser a first request that includes the URL and the marking;
    extract the marking from the first request to form a second request and transmit the second request to the web server;
    receive, from the web server, a response that includes a resource identified by the URL;
    determine that the response corresponds to the second request;
    determine that the resource is in a first format that limits the ability of the proxy server to monitor user actions with respect to the resource through the client browser;
    responsive to the determining that the response corresponds to the second request and the determining that the resource is in the first format:
      convert the resource from the first format to a second format that enables the proxy server to monitor user actions with respect to the resource through the client browser; and
      transmit, to the client browser, the resource in the second format.

9. The system of claim 8, wherein the instructions, when executed by the processor, further causes the system to:
  receive monitoring information from the client browser regarding a user action with respect to the resource; and
  block an event associated with the user action based at least on the monitoring information.

10. The system of claim 9, wherein the event comprises one of:
  copying a content of the resource;
  editing the resource;
  saving the resource;
  printing the resource; or
  downloading the resource in the first format.

11. The system of claim 8, wherein the markup language element of the first web page comprises one of:
  an iframe HTML element;
  an object HTML element; or
  an embed HMTL element.

12. The system of claim 8, wherein marking the URL comprises appending the marking to the URL.

13. The system of claim 8, wherein the first format is a Portable Document Format (PDF), and the resource is a PDF file.

14. The system of claim 8, wherein converting the resource from the first format to the second format comprises:
  converting the resource from the first format into a byte array; and
  generating a second web page that includes a script that when executed by the client browser causes the client browser to render the contents of the resource using the byte array; and
  wherein transmitting, to the client browser, the resource in the second format comprises:
  transmitting the second web page to the client browser.

15. A computer-readable storage medium having computer-executable instructions stored thereon that, when executed by a processor, causes the processor to:
  receive a first web page from a web server;
  inject a client-side script into the first web page to form a modified first web page, the client-side script being configured to cause a client browser to:
    detect client-side creation of a markup language element in the modified first web page having a source uniform resource locator (URL) that references a remote resource, and
    mark, responsive to detecting client-side creation of the markup language element, the URL by modifying the URL to include a marking;
  transmit the modified first web page to the client browser;
  receive from the client browser a first request that includes the URL and the marking;
  extract the marking from the first request to form a second request and transmit the second request to the web server;
  receive, from the web server, a response that includes a resource identified by the URL;
  determine that the response corresponds to the second request;
  determine that the resource is in a first format that is associated limits the ability of the proxy server to monitor user actions with respect to the resource through the client browser;
  responsive to the determining that the response corresponds to the second request and the determining that the resource is in the first format:
    convert the resource from the first format to a second format that enables the proxy server to monitor user actions with respect to the resource through the client browser; and
    transmit, to the client browser, the resource in the second format.

16. The computer-readable medium of claim 15, wherein the instructions, when executed by the processor, further causes the processor to:
  receive monitoring information from the client browser regarding a user action with respect to the resource; and
  block an event associated with the user action based at least on the monitoring information.

17. The computer-readable medium of claim 16, wherein the event comprises one of:

copying a content of the resource;
editing the resource;
saving the resource;
printing the resource; or
downloading the resource in the first format.

18. The computer-readable medium of claim 15, wherein the markup language element of the first web page comprises one of:
an iframe HTML element;
an object HTML element; or
an embed HMTL element.

19. The computer-readable medium of claim 15, wherein the first format is a Portable Document Format (PDF), and the resource is a PDF file.

20. The computer-readable medium of claim 15, wherein converting the resource comprises:
wherein converting the resource from the first format to the second format comprises:
converting the resource from the first format into a byte array; and
generating a second web page that includes a script that when executed by the client browser causes the client browser to render the contents of the resource using the byte array; and
wherein transmitting, to the client browser, the resource in the second format comprises:
transmitting the second web page to the client browser.

\* \* \* \* \*